(12) United States Patent
Shahbazi et al.

(10) Patent No.: US 7,138,623 B2
(45) Date of Patent: Nov. 21, 2006

(54) POWER TRANSFER DEVICE WITH CONTACTLESS OPTICAL ENCODER AND COLOR REFLECTIVE SURFACE

(75) Inventors: Iraj Shahbazi, Manlins, NY (US); Victor L. Brezee, Auburn, NY (US); Randy Adler, Seneca Falls, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 165 days.

(21) Appl. No.: 11/010,729

(22) Filed: Dec. 13, 2004

(65) Prior Publication Data
US 2006/0124844 A1    Jun. 15, 2006

(51) Int. Cl.
*G01D 5/34*    (2006.01)

(52) U.S. Cl. .................. 250/231.14; 250/231.13; 250/231.14; 250/231.17; 250/231.18; 356/615; 356/616

(58) Field of Classification Search .................
250/231.13–231.18, 226, 214 PR; 356/614–617; 341/11, 13; 33/1 PT, 1 N, 1 L
See application file for complete search history.

(56) References Cited

U.S. PATENT DOCUMENTS

| | | | |
|---|---|---|---|
| 4,184,107 A | | 1/1980 | Turini et al. |
| 4,450,403 A | | 5/1984 | Dreiseitl et al. |
| 4,774,494 A | * | 9/1988 | Extance et al. ............. 341/6 |
| 4,779,075 A | | 10/1988 | Zägelein et al. |
| 5,183,056 A | | 2/1993 | Dalen et al. |
| 5,216,245 A | * | 6/1993 | Keegan et al. ......... 250/227.23 |
| 5,260,650 A | | 11/1993 | Schwesig et al. |
| 5,698,849 A | | 12/1997 | Figueria, Jr. |
| 6,194,709 B1 | * | 2/2001 | Briggs et al. .......... 250/231.14 |
| 6,198,246 B1 | | 3/2001 | Yutkowitz |
| 6,239,723 B1 | | 5/2001 | Bauerschmidt et al. |
| 6,259,221 B1 | | 7/2001 | Yutkowitz |
| 6,281,650 B1 | | 8/2001 | Yutkowitz |
| 6,313,460 B1 | | 11/2001 | Haas et al. |
| 6,318,187 B1 | | 11/2001 | Griepentrog et al. |
| 6,363,912 B1 | | 4/2002 | Flach |
| 6,433,534 B1 | | 8/2002 | Spellman |
| 6,492,807 B1 | | 12/2002 | Spellman |
| 6,523,523 B1 | | 2/2003 | McCoy et al. |
| 6,605,939 B1 | | 8/2003 | Jansseune et al. |
| 6,615,644 B1 | | 9/2003 | Koo et al. |

(Continued)

OTHER PUBLICATIONS

Merriam-Webster OnLine Dictionary: http://www.m-w.com/dictionary/spectrum.*

*Primary Examiner*—Stephone B. Allen
*Assistant Examiner*—Davienne Monbleau
(74) *Attorney, Agent, or Firm*—Harness, Dickey & Pierce, P.L.C.

(57) ABSTRACT

An angular offset sensing device includes an optical encoder having a light generating element and a light sensor. An armature includes a reflective surface having a generally semicircular shape and a spectrum of color disposed thereon varying from a first end of the surface to a second end of the surface. A housing encloses both the optical encoder and the armature and rotationally supports the armature. An electrical voltage is generated when light from the light generating element is reflected back to the sensor from the reflective surface. The voltage is proportional to a wavelength of the reflected light and is indicative of an angular rotation of the armature relative to the optical encoder. The voltage is corrected for linearity and used for example to signal a vehicle transfer case shift.

40 Claims, 10 Drawing Sheets

U.S. PATENT DOCUMENTS

| | | |
|---|---|---|
| 6,639,398 B1 | 10/2003 | Genot et al. |
| 6,653,828 B1 | 11/2003 | Dordet et al. |
| 6,721,385 B1 | 4/2004 | Siess et al. |
| 6,796,035 B1 | 9/2004 | Jahn et al. |
| 2005/0094159 A1* | 5/2005 | Su ............................. 356/620 |
| 2005/0189479 A1* | 9/2005 | Su ......................... 250/231.13 |

* cited by examiner

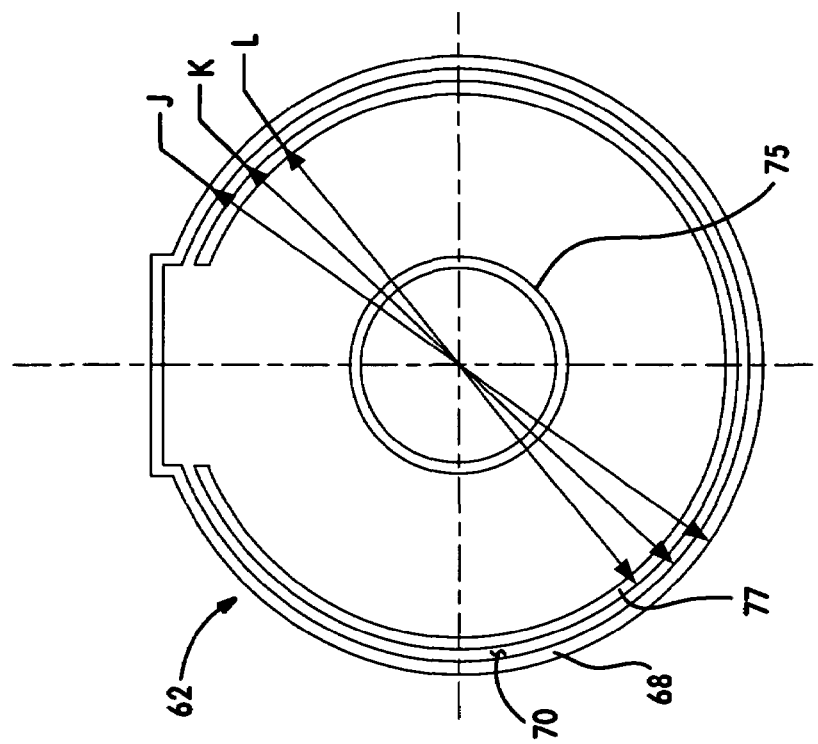
FIG. 8
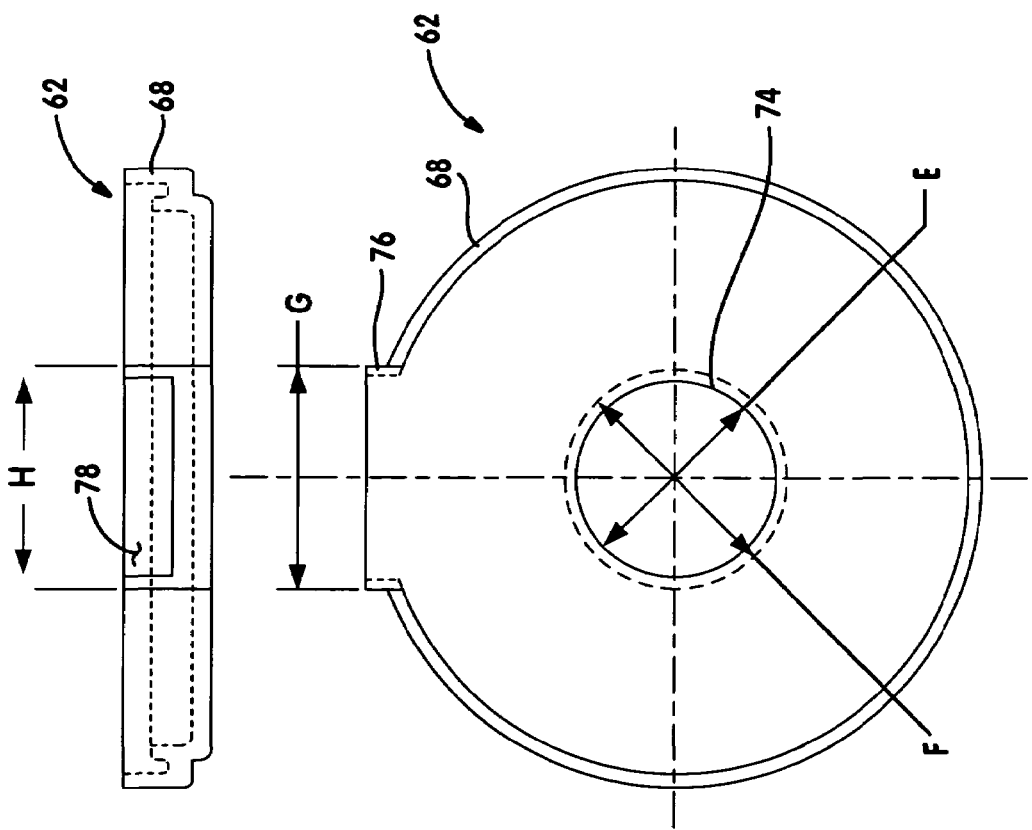
FIG. 9
FIG. 7

POWER TRANSFER DEVICE WITH CONTACTLESS OPTICAL ENCODER AND COLOR REFLECTIVE SURFACE

FIELD OF THE INVENTION

The present invention relates in general to rotational sensor systems and more specifically to angular rotational sensor systems used to direct operation of power transfer devices.

BACKGROUND OF THE INVENTION

Systems for determining the position of rotating shafts are known. Existing systems including sensors which determine a relative position between a gear tooth and a reference tooth are known. Other systems include variable reluctance sensors, multiple element tone rings, inductive magnetic sensor systems and systems which utilize one or more brushes to physically make contact between a rotating part and a reference point.

Known systems for determining angular rotation are susceptible to damage from environmental conditions such as dirt, grease and oil products. Systems utilizing brushes for contact are additionally susceptible to wear and/or oxidation of the brushes which leads to a decreased accuracy of the system as well as increased maintenance costs.

Optical sensors used for determining torque or rotational speed are also known. Optical encoders having two outputs are capable of determining both a shaft movement and a direction of shaft movement. Incremental encoders having a third output are also known which can locate a unique angular position on a rotating shaft.

A disadvantage of known systems using optical encoders is that the number of light sources such as light emitting diodes (LED) increases as the complexity of the measurement type increases. This increases the cost of the system and increases the complexity of the circuitry required to receive and correlate all of the received signal data. There is therefore a need for a system for determining angular rotation which reduces the number of components required and simplifies the overall circuitry.

SUMMARY OF THE INVENTION

An angular rotation identification device with a contactless optical encoder according to a preferred embodiment of the present invention includes an optical device having a light generating element and a light sensor. A reflective surface has a generally semicircular perimeter shape and a spectrum of color varying from a first end of the surface to a second end of the surface. An electrical voltage generated by light from the light generating element being reflected back to the sensor upon angular rotation of the reflective surface with respect to the optical device is proportional to a wavelength of the color.

According to another aspect of the present invention, an angular offset sensing device includes an optical encoder having a light generating element and a light sensor. A reflective surface is integrally included in an armature. A housing encloses both the optical encoder and the armature and rotationally supports the armature. An electrical voltage generated by light from the light generating element being reflected back to the sensor from the reflective surface is proportional to a wavelength of the light.

According to yet another aspect of the present invention, an optical angular offset sensing system includes an optical device including a light generating element and a light sensor. A reflective surface includes a generally semicircular perimeter shape and a spectrum of color varying from a first end of the surface to a second end of the surface. At least one color is disposable on the reflective surface having a wavelength continuously increasing between the first end and the second end. An electrical voltage controlled by light from the light generating element being reflected back to the sensor from the reflective surface is proportional to the wavelength of the light reflected to the optical device.

According to yet another aspect of the present invention, a discrete circuit separate from the optical device is operable to convert the electrical voltage to a linear voltage. The linear voltage is indicative of a device angular offset.

According to yet another aspect of the present invention, a method for controlling a power transfer device using an optical device having a light generating element and a photo-detector device, and a reflective surface includes: producing an output light from the light generating element; applying a spectrum of color varying from a first end of the reflective surface to a second end of the reflective surface; rotatably positioning the reflective surface to reflect the light from the reflective surface to the photo-detector device such that a wavelength of the color continuously increases between the first and second ends; controlling the flow of an electrical current using the photo-detector device, the electrical current and voltage being proportional to the wavelength of the color and the electrical current allowed by the photo-detector; and using the electrical voltage to control a shift position of the power transfer device.

According to yet still another aspect of the present invention, a method for sensing angular offset using an optical device having a light generating element and a photo-detector device, and a reflective surface includes: producing an output light from the light generating element; applying a spectrum of color varying from a first end of the reflective surface to a second end of the reflective surface such that a wavelength of the color continuously increases between the first and second ends; positioning the reflective surface to reflect the light from the reflective surface to the photo-detector device; and controlling an electrical voltage using the photo-detector device, the electrical voltage being proportional to the wavelength of the color.

A power transfer device with contactless optical encoder of the present invention provides several advantages. By using an optical encoder to both transmit light and collect the light after reflection from a reflective surface, brushes previously known for the application of sensing angular rotation are eliminated, which reduces maintenance and improves sensor life. By varying a range of colors or varying a single color intensity along the reflective surface, a substantially linear voltage output from the encoder and encoder circuitry is produced which can be used to direct the shifting of, for example, a power transfer case. The reflective surface provides a constant slope. A distance from the optical encoder to the reflective surface as the reflective surface rotates therefore changes at a predetermined rate. Rotational motion is thereby sensed as changing reflected light frequency which is converted to a substantially linear analog signal.

Further areas of applicability of the present invention will become apparent from the detailed description provided hereinafter. It should be understood that the detailed description and specific examples, while indicating two preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a plan view of a base member of the present invention;

FIG. 8 is a bottom plan view of the base member of FIG. 7;

FIG. 9 is an end elevational view of the base member of FIG. 7;

DETAILED DESCRIPTION OF THE PREFERRED EMBODIMENTS

The following description of the preferred embodiments is merely exemplary in nature and is in no way intended to limit the invention, its application, or uses.

Figure 1:
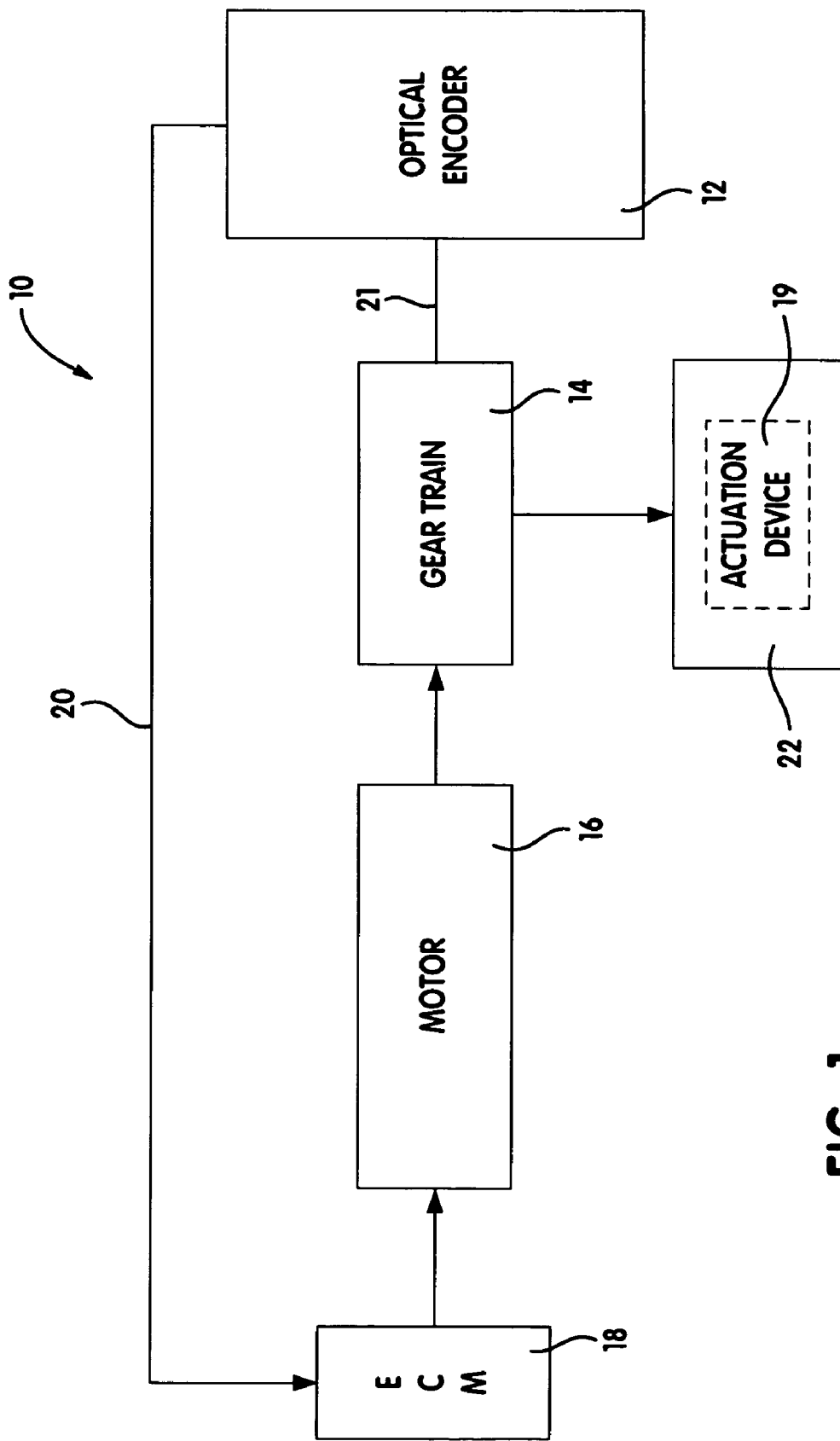
FIG. 1 is a flow diagram of a power transfer system with contactless optical encoder according to a preferred embodiment of the present invention.

Referring generally to FIG. 1 and according to a preferred embodiment of the present invention, an optical encoding system 10 includes an optical encoder 12 connectible to a gear train 14. The gear train 14 is subsequently connected to an electric motor 16. Optical encoder 12 is also connected to an electronic control module (ECM) 18 to feed electrical output signals from optical encoder 12 to ECM 18 via a communication path 20. Optical encoder 12 is connected to a shaft 21 of gear train 14 such that angular rotation of shaft 21 can be determined by optical encoder 12. Electrical signals from optical encoder 12 sent to ECM 18 are used to control the rotational speed of motor 16. Gear train 14 is used to convert the relatively high rotational speed and low torque of motor 16 to a relatively lower speed, high torque output. Gear train 14 is also used to control the shift position of a movable actuation device 19 associated with the power transfer device 22 which in one embodiment of the present invention includes a transfer case for an automobile vehicle (not shown). Such actuation devices 19 may include, without limitation, a range shift mechanism of a multi-speed gearset or a clutch actuator used to apply a clutch engagement force on a friction clutch.

Figure 2:
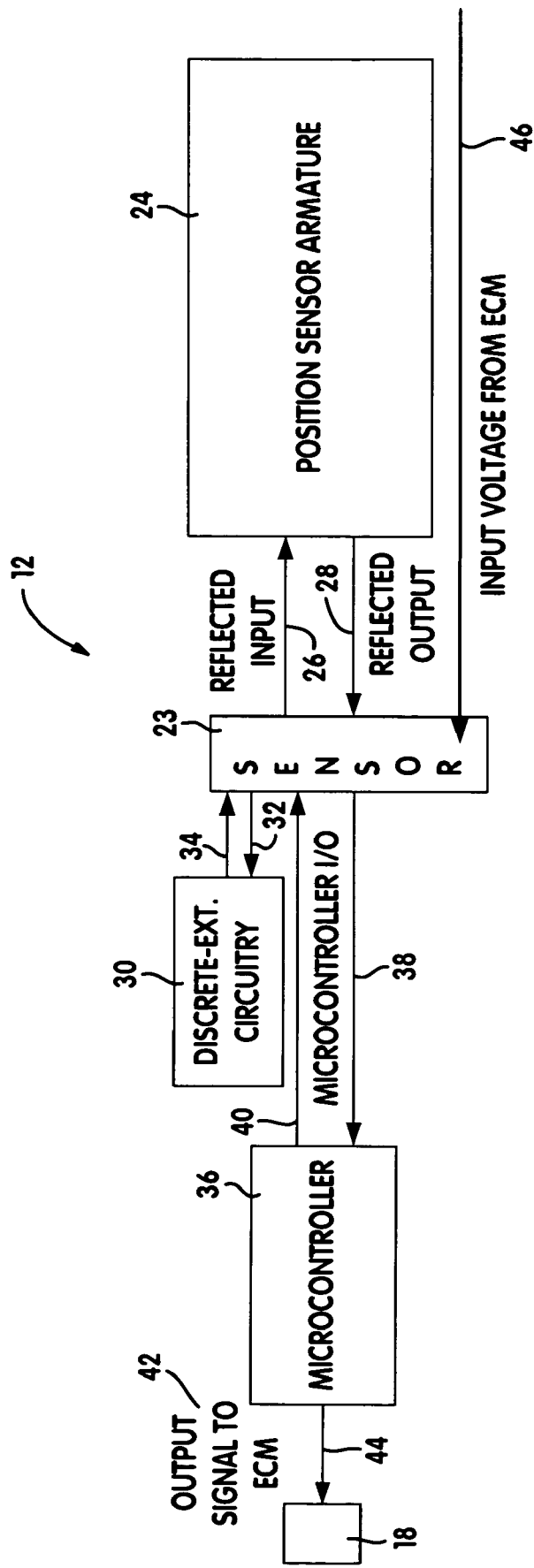
FIG. 2 is a flow diagram of the optical encoder components for the system of FIG. 1.

Referring generally to FIG. 2, optical encoder 12 includes a sensor 23 positioned adjacent to an armature 24. Light generated by sensor 23 is transmitted to armature 24 as input light 26. Light reflected by armature 24 is returned to sensor 23 as reflected output 28. A discreet external circuit 30 is connected to sensor 23 via a circuit input line 32 and a circuit output line 34. A microcontroller 36 is also connected to sensor 23 via an input line 38 and an output line 40, respectively. Electrical signals generated by microcontroller 36 are forwarded to ECM 18 as output electrical signals 42 via a microcontroller output line 44. Electrical power for sensor 23 is provided from ECM 18 to sensor 23 via a sensor input voltage line 46.

Figure 3:
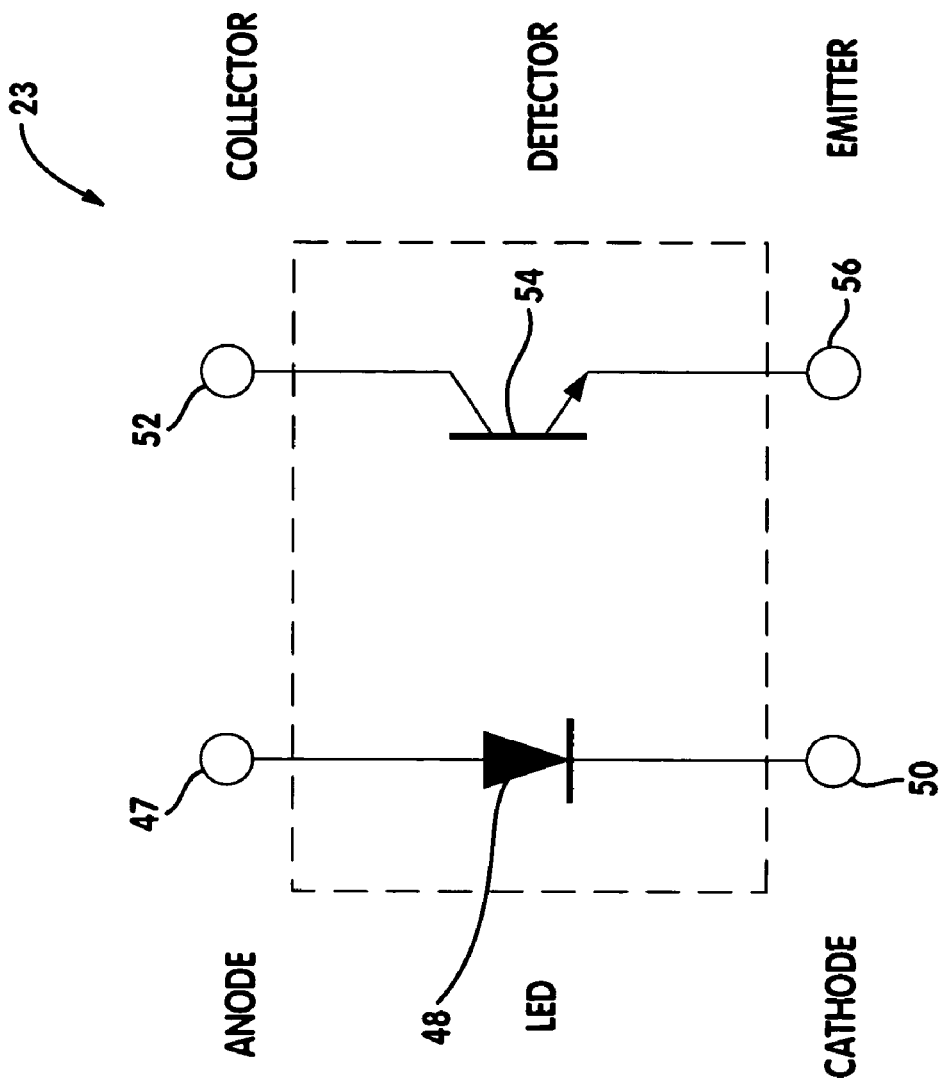
FIG. 3 is an electrical diagram identifying the components for a sensor of the present invention.

Referring next to FIG. 3, individual components of sensor 23 include an anode 47 which connects electrical voltage to a light emitting diode (LED) 48. Current from anode 47 flows through LED 48 and is discharged via a cathode 50 to ground. Sensor 23 further includes a collector 52 which also receives a current input to supply a photo-transistor detector 54. Current from collector 52 transferred via photo-transistor detector 54 is discharged via an emitter 56.

Figure 4:
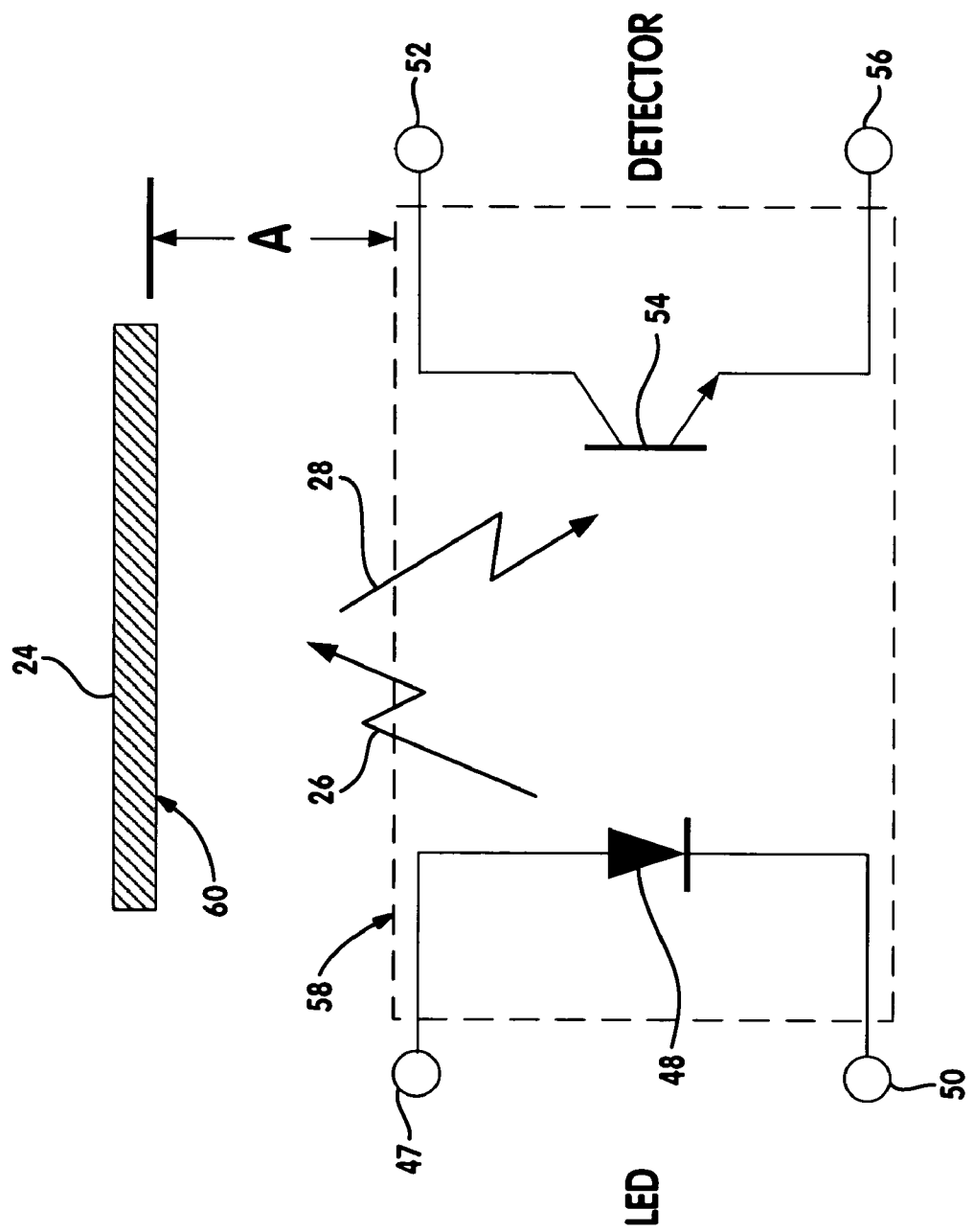
FIG. 4 is an electrical diagram similar to FIG. 3 further identifying an LED output path as well as a reflected light path returning to a detector of the present invention.

Referring now specifically to FIG. 4, the operation of sensor 23 is further identified. Current from anode 47 to LED 48 generates a light output which is transmitted via a light transparent surface 58 to a reflective surface 60 of armature 24. The input light 26 is reflected by reflective surface 60 and returned as reflected output 28 to photo-transistor detector 54. As reflected output 28 reaches photo-transistor detector 54, the voltage across photo-transistor detector 54 increases in proportion to the amount and frequency of reflected light received. A separation distance "A" is normally provided between light transparent surface 58 of sensor 23 and reflective surface 60. In one preferred embodiment of the present invention separation distance "A" is approximately 1.5 millimeters.

Figure 6:
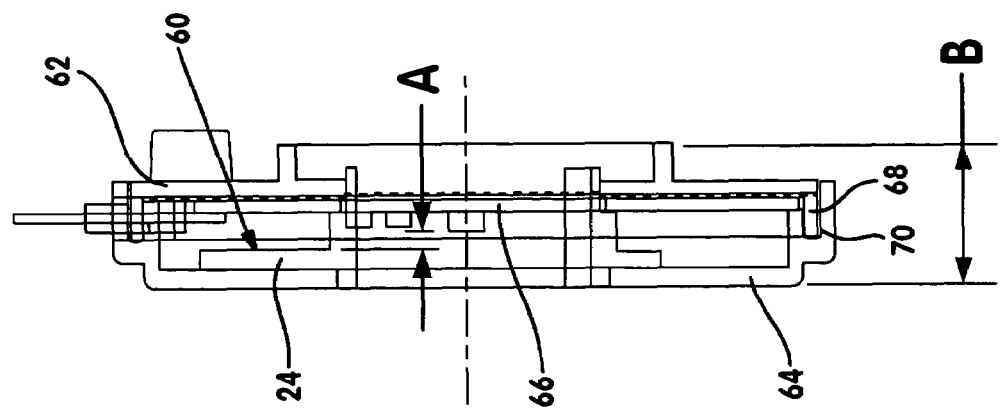
FIG. 6 is a side elevational view of the optical encoder device of FIG. 5.
Figure 5:
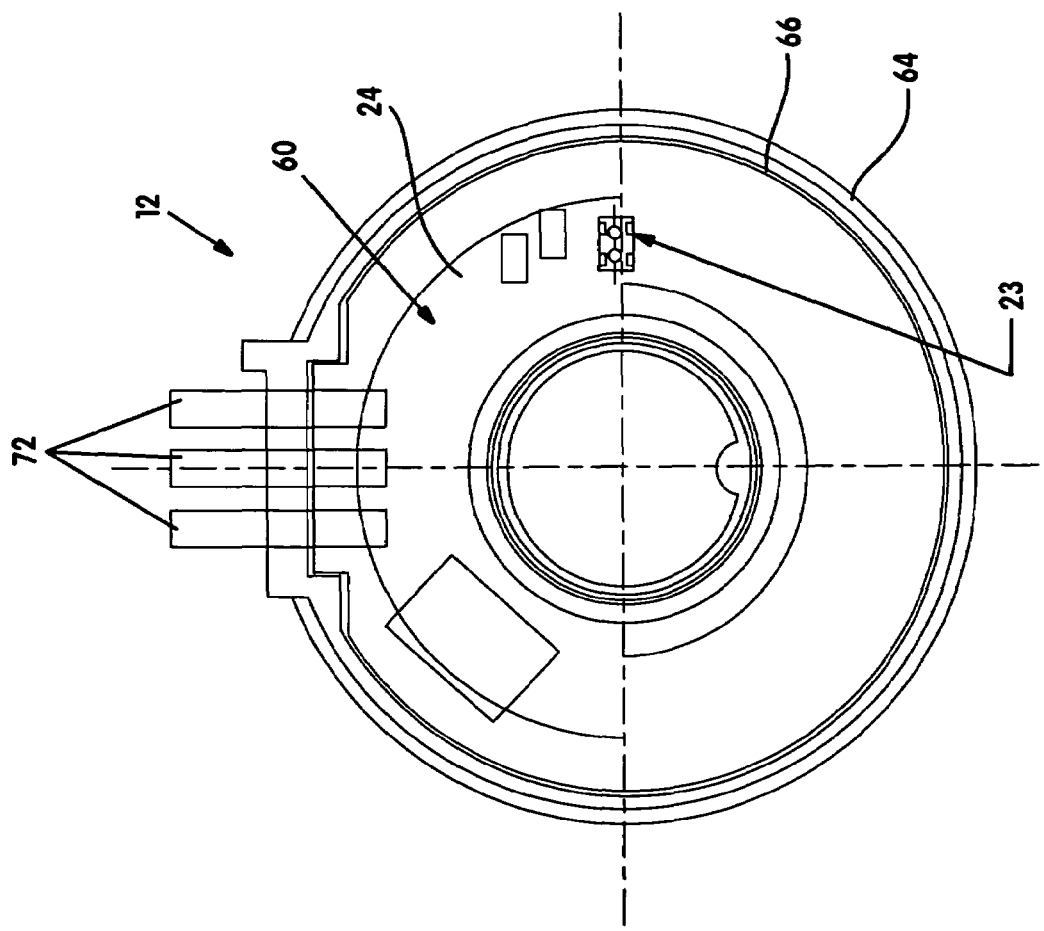
FIG. 5 is a plan view of an optical encoder device of the present invention.

Referring generally to FIGS. 5 and 6, optical encoder 12 according to one preferred embodiment of the present invention is constructed with armature 24 having reflective surface 60 enclosed between a base member 62 and a cover member 64, respectively. Base member 62 and cover member 64 can be provided of a polymeric material which is preferably molded to the shapes identified in FIGS. 5 and 6. A circuit board 66 is disposed between base member 62 and cover member 64. Circuit board 66 functionally supports sensor 23. Sensor 23 is connected to circuit board 66 by known techniques such as using conductive adhesive or by soldering. Sensor 23 is thereby fixedly connected to circuit board 66. Armature 24 is rotatably received between cover member 64 and circuit board 66 such that armature 24 can be coupled to shaft 21 (shown in FIG. 1). Base member 62 is connected to cover member 64 via a perimeter wall 68 of base member 62 being slidably received within an annular slot 70 of cover member 64. Separation distance "A" is clearly distinguishable in reference to FIG. 6. An assembly width "B" of base member 62 and cover member 64 is approximately 11.2 mm in one preferred embodiment of the present invention. A plurality of electrical leads 72 are connected to circuit board 66 and in the embodiment shown in FIG. 5 extend outward from optical encoder 12 for connection to external electrical connections. Electrical connections made to leads 72 include a voltage supply such as sensor input voltage line 46 as well as ground connections and sensor 23 voltage/current output connections.

Referring generally now to FIGS. 7 through 9, base member 62 further includes a through aperture 74 with a through aperture diameter "E" provided through a sleeve 75 having a sleeve outer diameter "F". An opposed pair of engagement wall surfaces 76 have a wall spacing "G" defining a cavity 78 there-between. Cavity 78 has a cavity width "H". Annular slot 70 is provided between perimeter wall 68 and an inner perimeter wall 77. Perimeter wall 68 has an outer diameter "J". Annular slot 70 is defined between a base perimeter wall inner diameter "K" and an inner wall outer diameter "L" of inner perimeter wall 77.

In one preferred embodiment of the present invention, through aperture diameter "E" is approximately 22.3 millimeters, sleeve outer diameter "F" is approximately 25.3 millimeters, wall spacing "G" is approximately 25.1 millimeters and cavity width "H" is approximately 22.6 millimeters. It is further noted that in one preferred embodiment of the present invention, base outer diameter "J" is approximately 58.65 millimeters, base perimeter wall inner diameter "K" is approximately 56.15 millimeters and inner wall outer diameter "L" is approximately 53.5 millimeters. Through aperture diameter "E" provides clearance for slidably mounting armature 24 to sleeve 75. These dimensions are exemplary of one preferred embodiment of the present invention. It should be obvious that the dimensions provided herein can be varied for any application of an optical encoding system 10 of the present invention.

Figure 11:
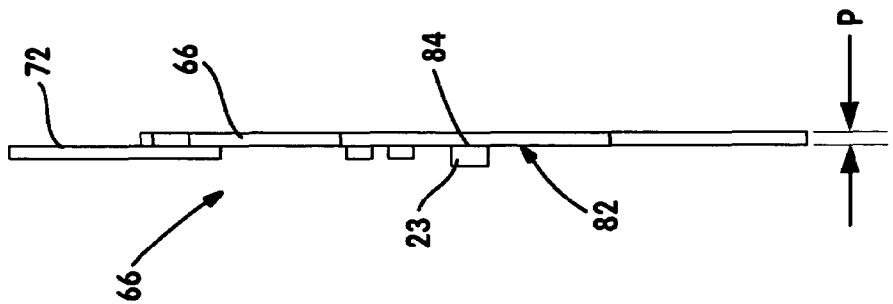
FIG. 11 is a side elevational view of the circuit board of FIG. 10.
Figure 10:
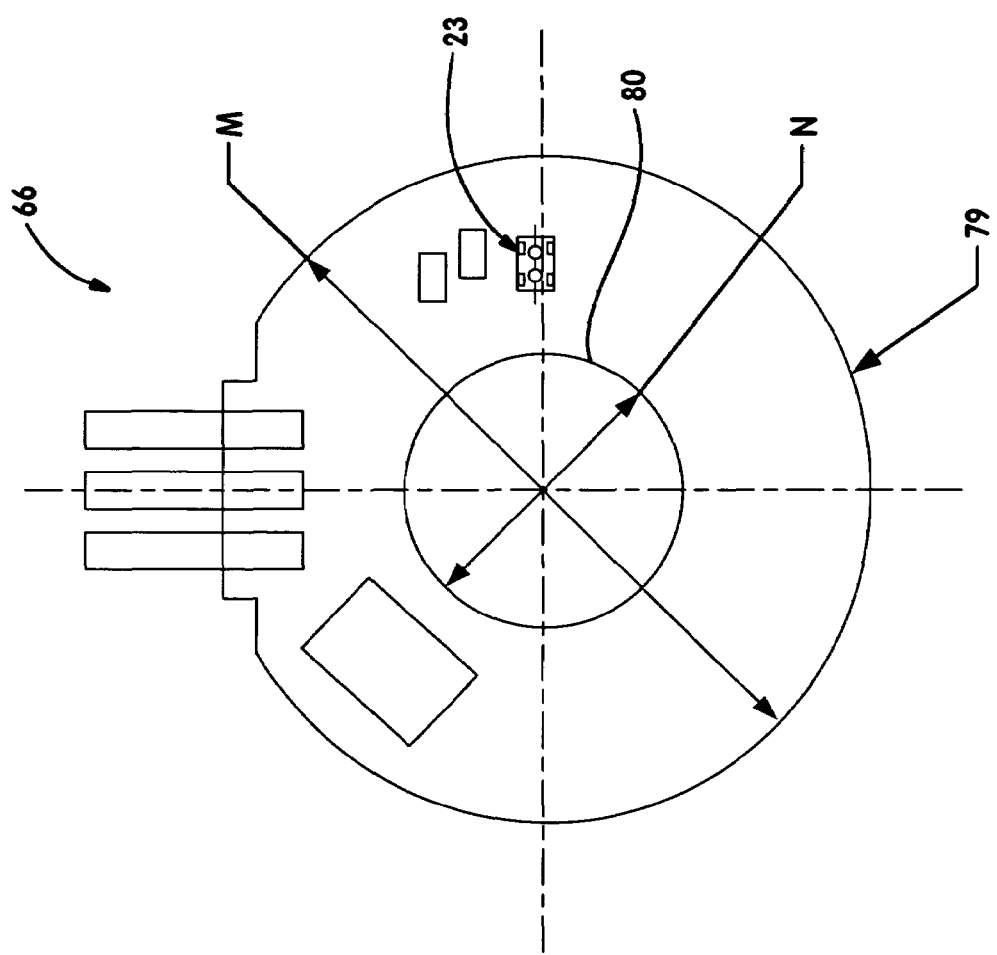
FIG. 10 is a plan view of a circuit board of the present invention.

Referring generally now to both FIGS. 10 and 11, circuit board 66 includes a perimeter 79 having a diameter "M". A circuit board aperture 80 is also provided having an aperture diameter "N". Sensor 23 is directly connectible to a surface 82 of circuit board 66 by forming a connecting joint 84. As previously noted, connecting joint 84 can be made using a conductive adhesive, a solder joint or other known electrical contact joining techniques. FIG. 11 also identifies that a substantial portion of leads 72 extend outwardly beyond perimeter 79 of circuit board 66. Leads 72 are also connected to surface 82 similar to sensor 23.

In one preferred embodiment of the present invention, diameter "M" is approximately 53 millimeters such that circuit board 66 is captured within base perimeter wall inner diameter "K" and physically retained against inner perimeter wall 77 as shown in FIG. 5. Circuit board 66 further includes a circuit board thickness "P". According to one preferred embodiment of the present invention, circuit board thickness "P" is approximately 1.1 millimeters.

Figure 12:
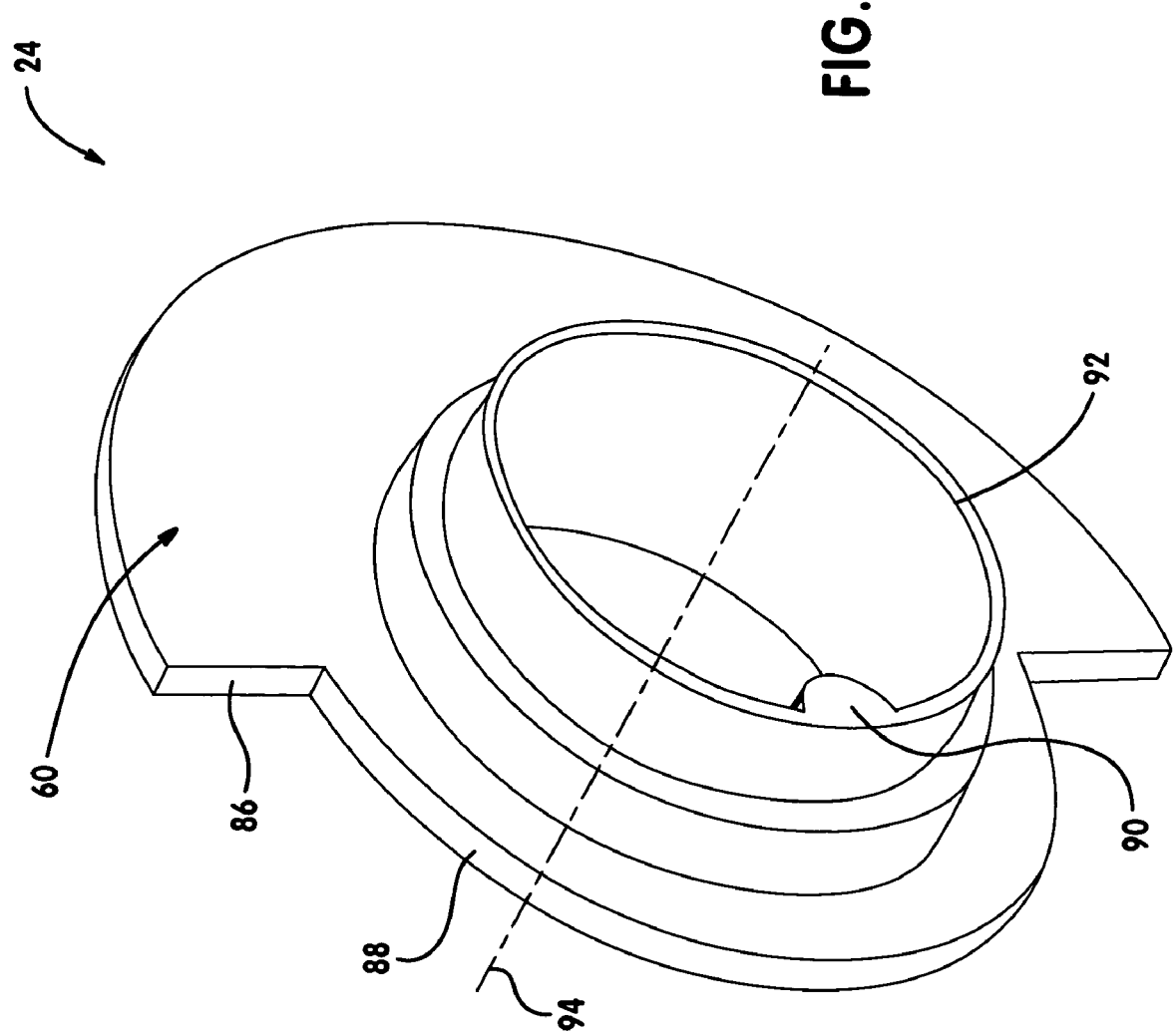
FIG. 12 is a perspective view of an armature of the present invention.

Referring now to FIG. 12, armature 24 includes reflective surface 60 formed on a first side of a semispherical flange portion 86. A reduced diameter flange portion 88 is oppositely positioned from semispherical flange portion 86. An engagement tooth 90 is provided within a sleeve 92 which longitudinally extends through armature 24 and is coaxially aligned with an armature axis of rotation 94. Shaft 21 (shown in reference to FIG. 1), is slidably received within sleeve 92. A suitable receiving slot (not shown) is formed within shaft 21 which receives engagement tooth 90. Any rotation of shaft 21 therefore provides an equivalent rotation of armature 24.

Figures 13, 14:
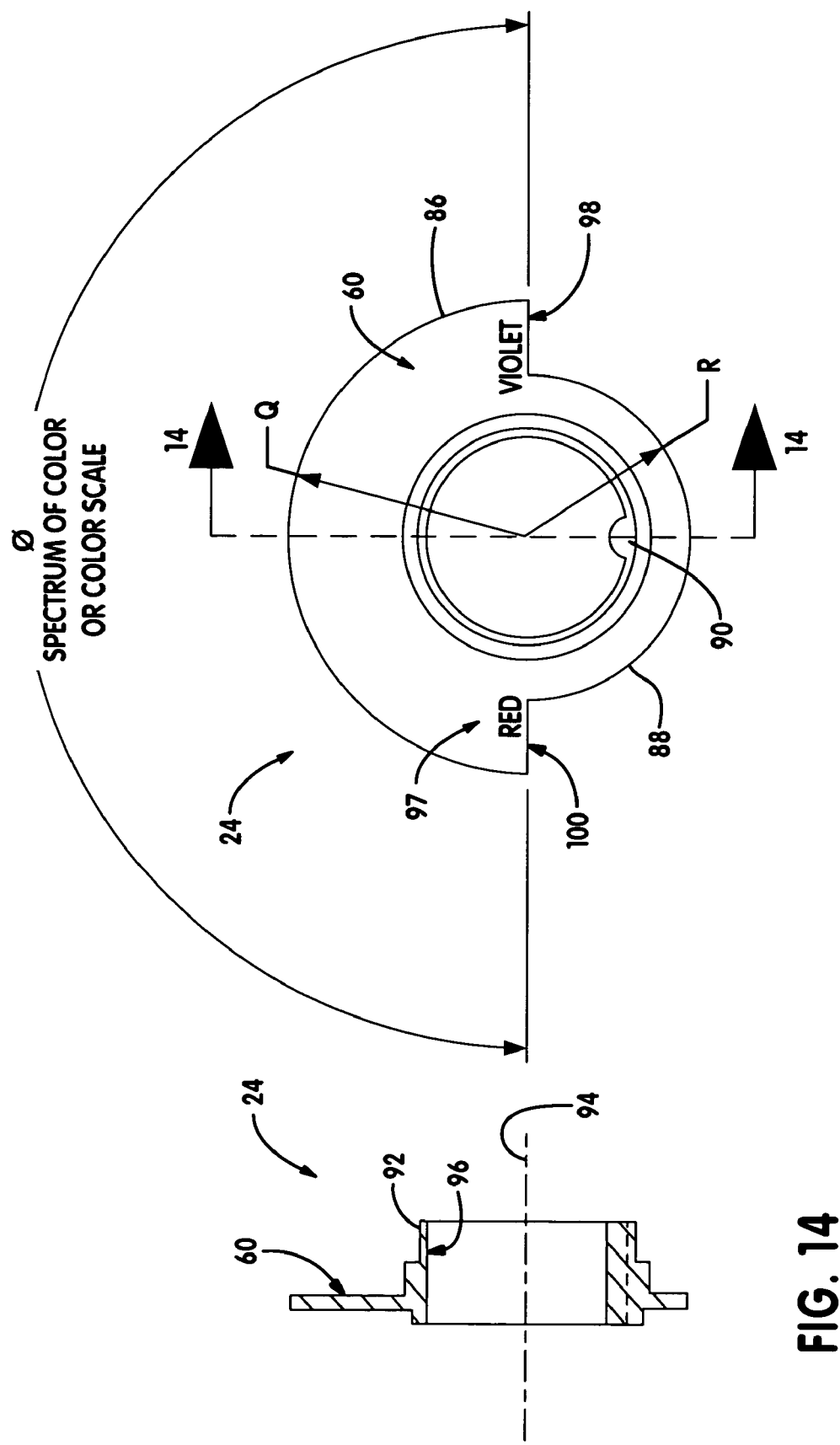
FIG. 13 is a plan view of the armature of FIG. 12 providing a reflective surface for the optical encoder of the present invention.
FIG. 14 is a cross sectional view taken at section 14 of FIG. 13.

Referring generally now to both FIGS. 13 and 14, sleeve 92 provides a sleeve inner wall 96 to slidably receive shaft 21. At least one color 97 is disposed as a spectrum of color or as a color scale on reflective surface 60. In the embodiment shown, color 97 starts at a first end 98 of semispherical flange portion 86 and extends to a second end 100 of semispherical flange portion 86. Color 97 can be provided as shown ranging from a violet to a red color spectrum. In another embodiment of the present invention (not shown) color 97 is formed as varying intensities of a color such as black beginning at first end 98 as a light black or gray and extending to a fully black color adjacent-second end 100. Semispherical flange portion 86 is defined within an angle E. Angle θ can vary at the discretion of the designer and to suit a desired angular rotation of shaft 21. In one preferred embodiment of the present invention, angle θ is approximately 180°. In an alternate embodiment of the present invention angle θ is approximately 155°.

Semispherical flange portion 86 includes a semishere radius "Q". Reduced diameter flange portion 88 includes a radius "R". In one preferred embodiment of the present invention, semisphere radius "Q" is approximately 22.28 millimeters and radius "R" is approximately 15.2 millimeters.

Referring now to FIGS. 4, 5 and 13, light from sensor 23 is emitted by LED 48, reflected from reflective surface 60 and received by photo-transistor detector 54. The light reflected from reflective surface 60 has a wavelength which is determined by the particular color or intensity of color disposed along reflective surface 60. An electrical voltage produced by photo-transistor detector 54 is therefore directly proportional to a wavelength of the reflected light. Optical encoding system 10 therefore provides an electrical signal from optical encoder 12 which is directly proportional to the wavelength of reflected light. As armature 24 rotates with respect to sensor 23, the output voltage of sensor 23 varies with the wavelength of the reflected light. This permits a direct correlation between the output voltage of sensor 23 and an angular rotation of shaft 21. Because armature 24 and circuit board 66 are substantially enclosed between base member 62 and cover member 64, contaminants are prevented from contacting reflective surface or sensor 23. This reduces the chance that reflected light from reflective surface 60 will vary in wavelength based on surface contamination.

Figure 16:
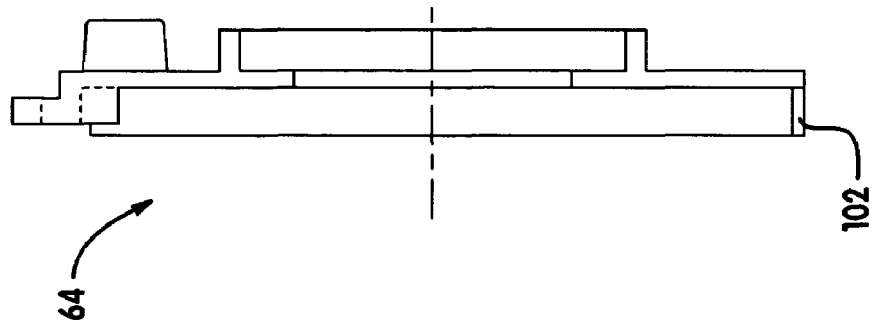
FIG. 16 is a side elevational view of the cover element of FIG. 15.
Figure 15:
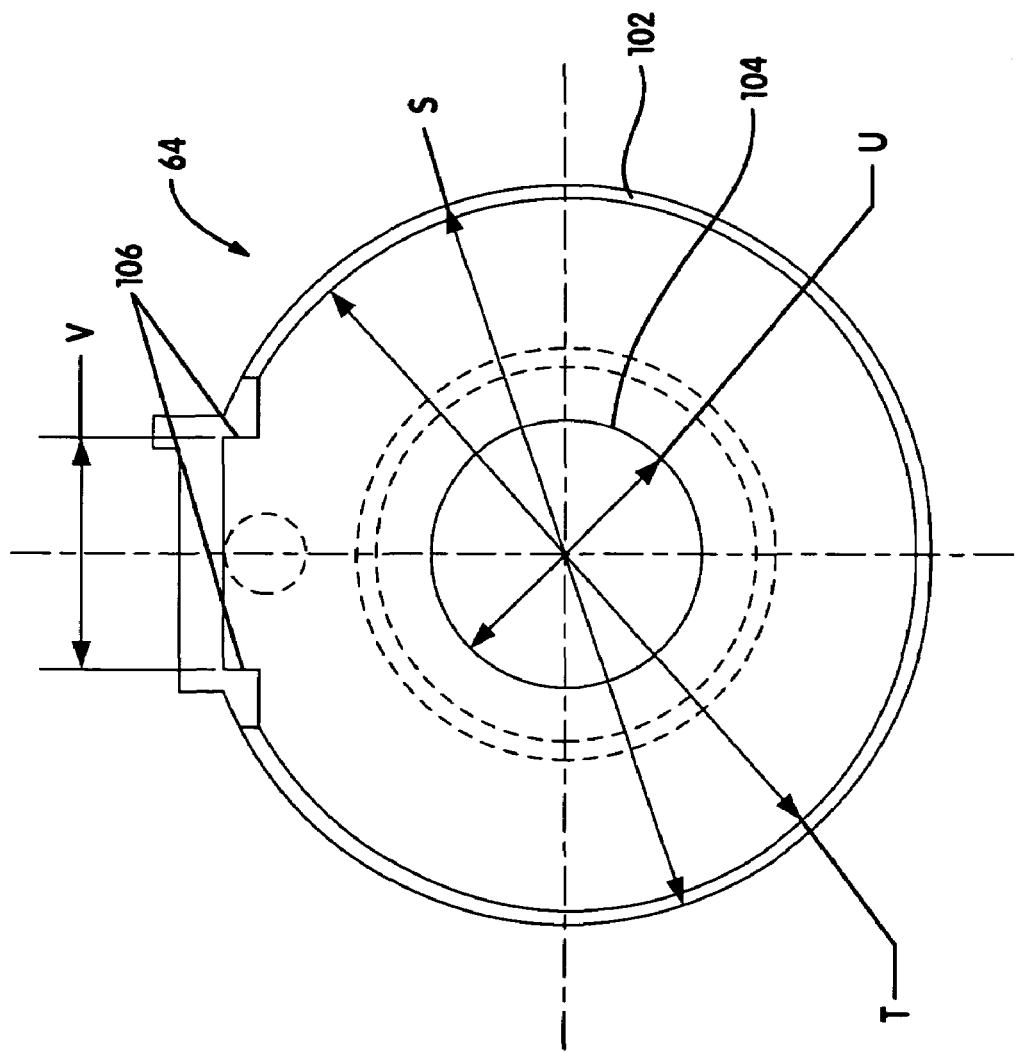
FIG. 15 is a plan view of a cover element for the optical encoder of the present invention.

Referring next to both FIGS. 15 and 16, cover member 64 includes a perimeter wall 102 which when assembled with base member 62 as seen in FIG. 6, extends outwardly of perimeter wall 68. Cover member 64 also includes an aperture 104 having an aperture diameter "U". An opposed pair of engagement surfaces 106 are created at one location of perimeter wall 102. A clearance dimension "V" is provided between engagement surfaces 106. In one preferred embodiment of the present invention, cover diameter "S" is approximately 55.6 millimeters, cover inner diameter "T" is approximately 53.6 millimeters, aperture diameter "U" is approximately 20.8 millimeters and clearance dimension "V" is approximately 18.3 millimeters.

As armature 24 rotates relative to circuit board 66 and sensor 23, sensor 23 receives reflected light in wavelengths in the visible light region of the electromagnetic spectrum between approximately 35 nanometers to approximately 1,000 nanometers. In one preferred embodiment of the present invention, the received wavelengths range between approximately 35 nanometers to approximately 750 nanometers and correspond to an angle θ of approximately 155°. A voltage produced by sensor 23 ranges from zero to approximately 5 volts DC. A linear output voltage of sensor 23 is desirable to provide quantifiable ranges of voltages corresponding to desired shift points of power transfer device 22. Both external circuit 30 and microcontroller 36 are therefore provided to convert the output voltage of sensor 23 to a linear output voltage.

Referring back to FIGS. 1 through 4, sensor 23 receives input voltage from ECM 18 which is distributed to both anode 47 and collector 52. Light generated by LED 48 is directed towards reflective surface 60. The color or spectrum of colors provided on reflective surface 60 reflects light back to sensor 23 at a wavelength of the color at the relative position on reflective surface 60 directly adjacent to sensor 23. The received light is converted to an electrical voltage having a range of approximately 0 to 5 volts DC by photo-transistor detector 54 and emitted by emitter 56. This voltage is corrected by external circuit 30 and/or microcontroller 36 to a linear output voltage. The linear output voltage is forwarded by microcontroller 36 to ECM 18 where the voltage signal is used to direct motor 16 and gear train 14 to reposition power transfer device 22.

ECM 18 receives an operator's command for shifting power transfer device 22 to a desired position. ECM 18 generates a pulse width modulation signal which supplies power to motor 16 and gear train 14 to move power transfer device 22 to an appropriate position. Rotational movement of motor 16 and gear train 14 determines an angular position of optical encoder 12. The output of motor 16 is used as the input to gear train 14 to convert the relatively high speed, low torque output of motor 16 to the relatively low speed, high torque ouput from gear train 14. The low speed, high torque output of gear train 14 is used to shift the actuation devices 19 within power transfer device 22 and also to define a position of motor 16 via optical encoder 12. Typical shift positions associated with a power transfer device 22 having a two-speed gear reduction unit and an adaptive transfer clutch include 4 HI, AWD, 2 HI, neutral, and 4 LO. These positions are representative of an all-wheel drive vehicle. Similar positions can also be obtained for a power transfer device of a two-wheel drive and/or a four-wheel drive vehicle.

A power transfer device with contactless optical encoder of the present invention provides several advantages. By using an optical encoder to both transmit light and collect the light after reflection from a reflective surface, brushes previously known for this application of sensing angular rotation are eliminated. This reduces maintenance and improves system operational life. By varying a range of colors or varying a single color intensity along the reflective surface, a substantially linear voltage output from the encoder and encoder circuitry is used to direct the shifting of, for example, a power transfer case. The reflective surface is created on an armature. A distance from the optical encoder to the reflective surface as the reflective surface rotates is maintained at a substantially constant value. Rotational motion is thereby sensed as a changing reflected light frequency which is converted to a substantially linear analog signal without the need for physical contact between the sensor and armature.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An angular rotation identification device, comprising:
   an optical device including a light generating element and a light sensor; and
   a reflective surface having a generally semicircular perimeter shape and a spectrum of color varying from a first end of the surface to a second end of the surface;
   wherein an electrical voltage generated by light from the light generating element being reflected back to the sensor upon angular rotation of the reflective surface with respect to the optical device is proportional to a wavelength of the color.

2. The device of claim 1, further comprising a printed circuit board operable to support the optical encoder.

3. The device of claim 2, further comprising:
   an armature integrally including the reflective surface; and
   a housing operable to rotatably support the armature and fixedly support the printed circuit board.

4. The device of claim 3, wherein the housing further comprises:
   a base having a sleeve operable to support the armature; and
   a cover connectable to the base, the base and cover together operable to enclose both the armature and the printed circuit board.

5. The device of claim 1, wherein the voltage comprises a voltage range variable between approximately 0 volts DC to approximately 5 volts DC.

6. The device of claim 5, wherein the spectrum of color further comprises:
   a first color wavelength at the first end corresponding to the 0 volts DC voltage; and
   a second color wavelength at the second end corresponding to the 5 volts DC voltage.

7. The device of claim 5, wherein the voltage generated by the optical device at any location between the first and second ends is proportional to a relative position of the optical device between the first and second ends.

8. The device of claim 1, wherein the light generating element further comprises a light emitting diode.

9. The device of claim 1, wherein the light sensor further comprises a detector having a collector and an emitter.

10. The device of claim 1, wherein the first end and the second end are spaced a predetermined number of degrees apart from each other.

11. An optical angular offset sensing device, comprising:
    an optical encoder including a light generating element and a light sensor;
    an armature including a reflective surface, the reflective surface having a generally semicircular shape and a spectrum of color disposed thereon varying from a first end of the surface to a second end of the surface; and
    a housing operable to enclose both the optical encoder and the armature and rotationally support the armature;
    wherein an electrical voltage generated by light from the light generating element being reflected back to the sensor from the reflective surface is proportional to a wavelength of the light reflected from the reflective surface to the optical encoder and is indicative of an angular rotation of the armature relative to the optical encoder.

12. The device of claim 11, wherein the first and second ends are spaced a predetermined number of degrees apart from each other.

13. The device of claim 11, wherein the reflective surface comprises a variable reflectivity surface.

14. The device of claim 13, wherein the variable reflectivity surface comprises a plurality of colors having an increasing range of wavelengths between the first and second ends.

15. An optical angular offset sensing system, the system comprising:
    an optical device including a light generating element and a light sensor;
    a reflective surface having a generally semicircular perimeter shape and a spectrum of color varying from a first end of the surface to a second end of the surface; and
    at least one color disposable on the reflective surface having a wavelength continuously increasing between the first end and the second end;

wherein an electrical voltage generated by light from the light generating element being reflected back to the sensor from the reflective surface is proportional to the wavelength of the light reflected to the optical device.

16. The system of claim 15, wherein the wavelength of the light further comprises a continuously increasing wavelength between the first end and the second end.

17. The system of claim 15, wherein the at least one color comprises a plurality of colors spectrally ranging from violet to red.

18. The system of claim 15, wherein the at least one color comprises a single color having a continuously increasing color intensity along the reflective surface between the first end and the second end.

19. An optical angular offset sensing system, the system comprising:
   an optical device including a light generating element and a light sensor;
   a reflective surface having a generally semicircular perimeter shape and a spectrum of color varying from a first end of the surface to a second end of the surface;
   at least one color disposable on the reflective surface such that a wavelength of the color continuously increases between the first and second ends;
   an electrical voltage generated by light from the light generating element being received by the sensor after reflection from the reflective surface; and
   a discrete circuit separate from the optical device operable to convert the electrical voltage to a linear voltage indicative of a device angular offset.

20. The system of claim 19, further comprising a circuit board operable to fixedly support the optical device.

21. The system of claim 20, further comprising a base operable to support the circuit board.

22. The system of claim 21, further comprising a cover connectable to the base and operable together with the base to enclose the circuit board.

23. An optical angular offset sensing system, the system comprising:
   an optical device including a light generating element and a light sensor;
   a reflective surface having a generally semicircular perimeter shape and a spectrum of color varying from a first end of the surface to a second end of the surface such that an electrical voltage is generated by light from the light generating element being received by the sensor after reflection from the reflective surface;
   at least one color disposable on the reflective surface wherein a wavelength of the color continuously increases between the first and second ends; and
   an electronic control module connected to the optical device, the electronic module operable to receive the electrical voltage generated by the sensor and utilize the electrical voltage to control a shift position of an automotive transfer case.

24. The system of claim 23, further comprising a discrete circuit separate from the optical device operable to change the electrical voltage to a linear voltage.

25. The system of claim 23, further comprising an electrical motor connected between the electronic control module and the transfer case.

26. The system of claim 25, further comprising a gear train connected between the motor and the transfer case, the gear train operable to change the shift position of the transfer case.

27. The system of claim 26, wherein the gear train further comprises an output shaft, wherein the electrical voltage is directly proportional to an angular position of the output shaft.

28. The system of claim 23, further comprising a microcontroller connected between the electronic control module and the optical device.

29. A method for controlling a power transfer device using an optical device having a light generating element and a photo-detector device, and a reflective surface, the method comprising:
   producing an output light from the light generating element;
   applying a spectrum of color varying from a first end of the reflective surface to a second end of the reflective surface;
   rotatably positioning the reflective surface to reflect the light from the reflective surface to the photo-detector device such that a wavelength of the color continuously increases between the first and second ends;
   generating an electrical voltage using the photo-detector device, the electrical voltage being proportional to the wavelength of the color; and
   utilizing the electrical voltage to control a shift position of the power transfer device.

30. The method of claim 29, further comprising connecting an electronic control module to the optical device.

31. The method of claim 30, further comprising connecting a discrete circuit to the optical device.

32. The method of claim 31, further comprising changing the electrical voltage to a linear voltage using the discrete circuit.

33. The method of claim 29, further comprising applying a plurality of colors having an increasing range of wavelengths to the reflective surface between the first and second ends.

34. A method for sensing angular offset using an optical device having a light generating element and a photo-detector device, and a reflective surface, the method comprising:
   producing an output light from the light generating element;
   applying a spectrum of color varying from a first end of the reflective surface to a second end of the reflective surface such that a wavelength of the color continuously increases between the first and second ends;
   positioning the reflective surface to reflect the light from the reflective surface to the photo-detector device; and
   generating an electrical voltage using the photo-detector device, the electrical voltage being proportional to the wavelength of the color.

35. The method of claim 34, further comprising fixedly connecting the optical device to a circuit board.

36. The method of claim 35, further comprising fixedly mounting the circuit board to a base member.

37. The method of claim 36, further comprising co-molding the reflective surface to an armature.

38. The method of claim 37, further comprising rotatably mounting the armature to the base member.

39. The method of claim 36, further comprising attaching a cover to the base member, the cover and the base member together operable to enclose the circuit board.

40. The method of claim 37, further comprising rotating the armature within an angular range of approximately 155 degrees.

* * * * *